United States Patent [19]
Röder et al.

[11] Patent Number: 5,558,593
[45] Date of Patent: Sep. 24, 1996

[54] PLANET CARRIER OF A PLANETARY TRANSMISSION

[75] Inventors: Ulrich Röder, Nürnberg; Sigurd Wilhelm, Weisendorf; Werner Hehn, Erlangen; Uwe Hammerl, Herzogenaurach; Doris Greiner, Hagenau; Wolfgang Hentschke, Herzogenaurach; Udo Reinhardt, Höchstadt, all of Germany

[73] Assignee: Ina Walzlager Schaeffler KG, Germany

[21] Appl. No.: 407,449

[22] Filed: Mar. 17, 1995

[30] Foreign Application Priority Data

Apr. 2, 1994 [DE] Germany .................... 44 11 604.7

[51] Int. Cl.$^6$ ................................ F16H 57/08
[52] U.S. Cl. ........................... 475/331; 475/346
[58] Field of Search ...................... 475/331, 346

[56] References Cited

U.S. PATENT DOCUMENTS 4,986,802  1/1991  Scoville et al. .............. 475/346
5,269,733  12/1993  Anthony, III ................ 475/331

*Primary Examiner*—Charles A. Marmor
*Assistant Examiner*—Sherry Lynn Estremsky
*Attorney, Agent, or Firm*—Bierman & Muserlian

[57] ABSTRACT

A planet carrier (6) of a planetary transmission wherein planet gears (7) in mesh with an annulus (9) and a sun gear (10) are mounted on pins (8) which are guided on both sides of the planet gears (7) in lodgings (15,15a) of disk-shaped carrier elements (13,13a) connected to each other, characterized in that the lodgings (15,15a) are made in the form of pockets opening radially outwards to enable radial insertion of the pins (8).

8 Claims, 2 Drawing Sheets

PLANET CARRIER OF A PLANETARY TRANSMISSION

STATE OF THE ART

A planet carrier of a planetary transmission in which planet gears in mesh with an annulus and a sun gear are mounted on pins which are guided on both sides of the planet gears in lodgings of disk-shaped carrier elements connected to each other is known for example from "Zahnradgetriebe" by Johannes Lohmann, Springer-Verlag, N.Y., 1970. In the planet carrier shown in FIG. 3.57 on page 78, each of the pin ends is inserted into a bore of one of the two disk-shaped carrier elements. With this arrangement of the pins in bores of the carrier elements, there exist two possibilities for mounting the planet gears. If the planet carrier is split in the region of its central transverse plane, one end of the pin is first introduced into the bore of one of the carrier elements, the other carrier element is then mounted and the other end of the pin engages into the other bore. This type of assembly of the planet gears is very complicated and not suitable for compact sets of planet gears.

In the other case, the carrier elements are firmly connected to each other already before the mounting of the pins and it is technically unfavorable that the pin for mounting each planet gear has to be inserted almost wholly through the bore of one of the carrier elements so that its other end can be inserted into the bore of the other carrier element. During this operation, it is easily possible for the pin to tilt and thus cause damage to the carrier elements and the outer surface of the pin. A damage of the outer surface of the pin is particularly problematic when this surface serves as a raceway for rolling or sliding bearings. This applies particularly in cases in which the pins are pressed into the bores.

OBJECTS OF THE INVENTION

It is an object of the invention to provide an improved planet carrier of the precited type so that the aforesaid problems are eliminated.

This and other objects and advantages of the invention will become obvious from the following detailed description.

SUMMARY OF THE INVENTION

The novel planet carrier of the invention of a planetary transmission wherein planet gears in mesh with an annulus and a sun gear are mounted on pins which are guided on both sides of the planet gears in lodgings of disk-shaped carrier elements connected to each other, is characterized in that the lodgings are made in the form of pockets opening radially outwards to enable radial insertion of the pins. Because the lodgings are made in the form of pockets opening radially outwards for the radial insertion of the pins, this achieves this object.

In the planet carrier of the invention, the pins, already appropriately oriented, are introduced radially from the outside into their lodgings. Such configurations of planet carriers are particularly suitable for single-step planetary transmissions. A planet gear of a single-step planetary transmission has only one toothing and in these planetary transmissions, no tilting moments but only radial forces which are transmitted into the planet carrier via the two pin ends act on the planet gear. The planet gear cannot move in radial directions, or do so only very slightly, because in the one direction, it is supported on the annulus and in the other, on the sun gear. Therefore, it is not absolutely necessary to secure the pin against radial outward movements.

An advantageous feature of the invention is that the planet carrier comprises resilient projections which extend in the peripheral direction into the lodgings and overlap, at least partially, the radially outer surfaces of the pins lodged in the lodgings. Such resilient projections are advantageous, for example, when the planet carrier has to be pre-assembled with the pins and the planet gears mounted thereon. The pins are retained by the resilient projections secure against loss in their lodgings and cannot fall radially outwards out of the lodgings.

This retention against loss is assured in a simple manner by the fact that inner walls of the lodgings engage closely around more than half the periphery of the pins in the cross-sectional direction of the carrier elements, and each lodging merges into a funnel widening in the circumferential direction. The already oriented pins are introduced into the funnel and snap into the lodgings. In another feature of the invention, the two disk-shaped carrier elements are made in one piece with a hub which extends axially from one side of one of the carrier elements. Such planet carriers can be made of plastic material, particularly by injection molding.

The hub of the planet carrier is advantageously arranged on a driving shaft, made preferably as a solid shaft, and connected rotationally fast therewith by a toothing. Advantageously, the lodgings are made on axial extensions of the disk-shaped carrier elements, and opposing ends of these axially adjacent extensions comprise ribs or walls in a region facing end faces of the pins to axially secure the pins. To improve the rigidity of the planet carrier, the disk-shaped carrier elements are connected to each other in regions between successive planet gears by U-shaped crossbars.

DESCRIPTION OF THE PREFERRED EMBODIMENTS

Figure 1:
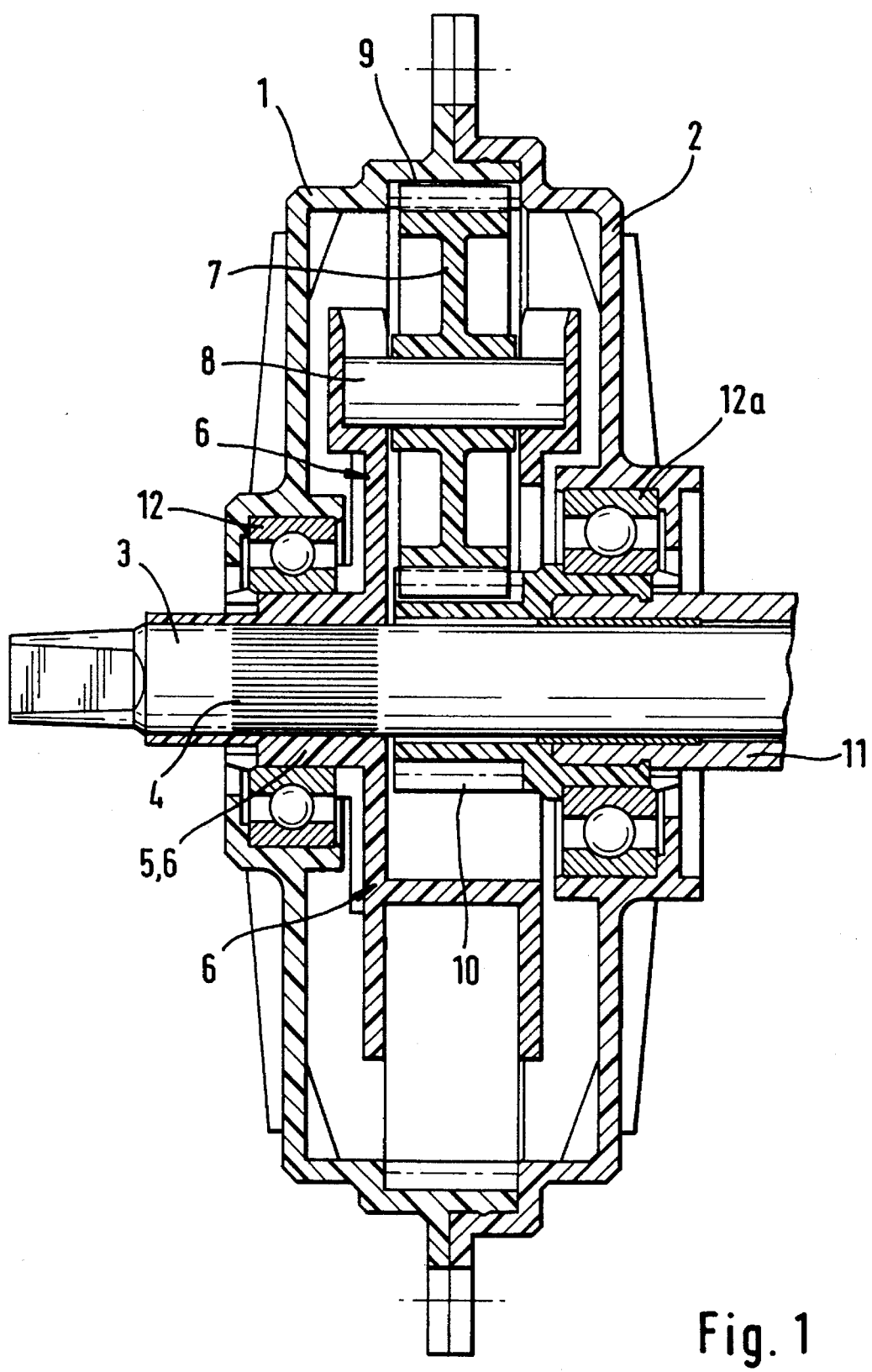
FIG. 1 is a longitudinal cross-section through a planetary gear having a planet carrier of the invention.

The planetary transmission shown in FIG. 1 comprises two vertically separated housing halves (1, 2) which are firmly connected to each other by a snap connection, not shown. A driving shaft (3) is inserted through both housing halves (1,2) and comprises a toothing (4) by which it is connected rotationally fast to a hub (5) of a planet carrier (6). A planet gear (7) is mounted rotatable relative to the planet carrier (6) on a pin (8). Each of the single-step planet gears (7) meshes with an annulus (9) formed on the inner periphery of the housing half (1) and with a sun gear 10 mounted rotatable relative to the driving shaft (3). The sun gear (10) is connected rotationally fast to a hollow driven shaft (11) through which the driving shaft (3) is inserted. The driven shaft (11) and the driving shaft (3) are mounted on rolling bearings (12,12a) for rotation relative to the housing halves (1,2).

Figure 2:
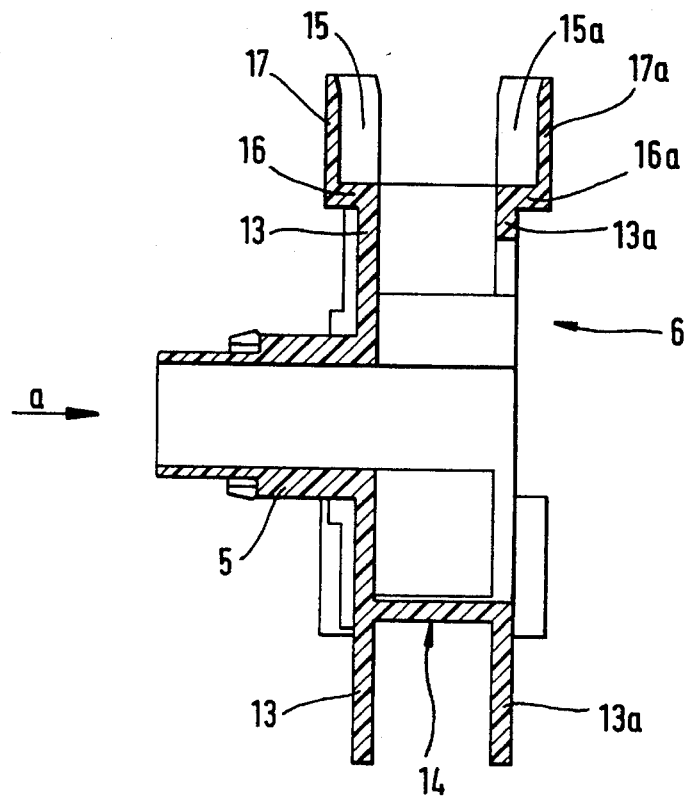
FIG. 2 is a longitudinal cross-section through the planet carrier taken along line II—II of FIG. 3.

FIG. 2 shows the planet carrier (6) of FIG. 1 as a separate part in longitudinal cross-section. Two axially adjacent disk-shaped carrier elements (13) and (13a) are integrally connected with each other by axial connecting profiles (14), the left-hand side carrier element (13) being in turn integrally connected with the axially extending hub (5). Spaced on the periphery of the disk-shaped carrier elements (13, 13a), there are arranged several lodgings (15,15a) in which the pins (8), not represented, of FIG. 1 are received. The figure shows only two lodgings (15,15a) for a pin (8) which are made on axial extensions (16,16a) of the disk-shaped carrier elements (13,13a). At their opposing ends, the axial extensions (16,16a) comprise circumferentially arranged walls (17,17a) which axially delimit the lodging (15,15a). The pins when inserted into the lodgings (15,15a) are thus secured against undesired movements in both axial directions.

Figure 3:
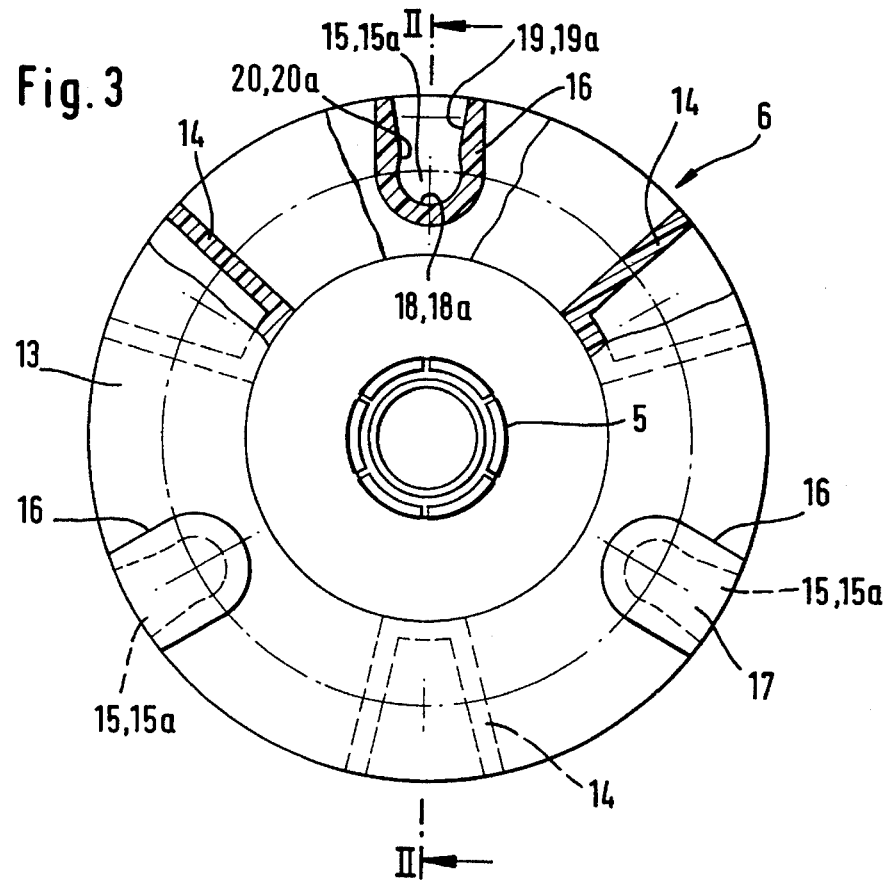
FIG. 3 is a front view of the planet carrier of the invention.

FIG. 3 shows a front view of the planet carrier (6) of FIG. 2 in the direction of arrow A. The longitudinal cross-section of the planet carrier (6) of FIG. 2 is taken along line II—II shown here. Mutually spaced lodgings (15,15a) and U-shaped connecting profiles (14) are arranged in alternating sequence on the periphery of the planet carrier (6). Further, a pitch circle connecting the center points of the cylindrical pins (8), not represented, is shown as a dot-dash line. It can be seen from the drawing that the lodging (15,15a) has a circular arc shaped bottom (18,18a) whose center lies on the aforementioned dot-dashed pitch circle. The circular arc shaped contour of the lodging (15,15a) extends beyond said pitch circle and then merges into a funnel (19,19a) widening in the circumferential direction. Thus, at the point of transition between the lodging (15,15a) and the funnel (19,19a), a resilient projection (20,20a) is formed, the clear width between two resilient projections (20,20a) facing each other in the circumferential direction being smaller than the diameter of the pin, not shown. In this planet carrier, it is guaranteed that after introduction into the funnel and surmounting of the resilient projections (20,20a), the pin, not shown, snaps into the lodging (15,15a).

Various modifications of the planet carrier of the invention may be made without departing from the spirit or scope thereof and it is to be understood that the invention is intended to be limited only as defined in the appended claims.

What we claim is:

1. A planet carrier (6) of a planetary transmission wherein planet gears (7) in mesh with an annulus (9) and a sun gear (10) are mounted on pins (8) which are guided on both sides of the planet gears (7) in lodgings (15, 15a) of disk-shaped carrier elements (13, 13a) connected to each other whereby the lodgings (15, 15a) are made in the form of pockets opening radially outwards to enable radial insertion of the pins (8), characterized in that said planet carrier (6) comprises resilient projections (20, 20a) which extend into the lodgings (15, 15a) and at least partially overlap radially outer surfaces of the pins (8) lodged in the lodgings (15, 15a).

2. A planet carrier of claim 1 wherein inner walls (18, 18a) of the lodgings (15, 15a) engage closely around more than half of periphery of the pins (8), and each lodging (15, 15a) merges into a funnel (19, 19a) which circumferential inside width increases in a radially outward direction.

3. A planet carrier of claim 1 wherein two disk-shaped carrier elements (13,13a) are made in one piece with a hub (5) which extends axially from one side of one of the carrier elements (13).

4. A planet carrier of claim 3 wherein the hub (5) is arranged on a driving shaft (3) and connected rotationally fast therewith by a toothing (4).

5. A planet carrier of claim 4 wherein the driving shaft is a solid shaft.

6. A planet carrier of claim 1 wherein the planet carrier (6) is made of a plastic material.

7. A planet carrier of claim 2 wherein the lodgings (15, 15a) are made on axial extensions (16, 16a) of disk-shaped carrier elements (13, 13a), whereby each extension (16, 16a) comprises ribs or walls (17,17a) in a region facing end faces of the pins (8) to axially secure the pins (8).

8. A planet carrier of claim 1 wherein the disk-shaped carrier elements (13,13a) are connected to each other in regions between successive planet gears (7) by U-shaped crossbars (4).

* * * * *